(12) United States Patent
Lee et al.

(10) Patent No.: US 9,169,941 B2
(45) Date of Patent: Oct. 27, 2015

(54) SOLENOID VALVE

(71) Applicant: Unick Corporation, Busan (KR)

(72) Inventors: Chang Hoon Lee, Busan (KR); Eui Dong Roh, Busan (KR); Ki Ryong Lee, Seoul (KR)

(73) Assignee: Unick Corporation, Busan (KR)

( * ) Notice: Subject to any disclaimer, the term of this patent is extended or adjusted under 35 U.S.C. 154(b) by 0 days.

(21) Appl. No.: 13/962,632

(22) Filed: Aug. 8, 2013

(65) Prior Publication Data
US 2014/0042353 A1   Feb. 13, 2014

(30) Foreign Application Priority Data

Aug. 8, 2012  (KR) .................. 10-2012-0086761

(51) Int. Cl.
| | |
|---|---|
| *F16K 31/06* | (2006.01) |
| *F16K 27/02* | (2006.01) |
| *H01F 7/16* | (2006.01) |

(52) U.S. Cl.
CPC .............. *F16K 31/06* (2013.01); *F16K 27/029* (2013.01); *F16K 31/0665* (2013.01); *H01F 7/1607* (2013.01); *Y10T 137/87217* (2015.04)

(58) Field of Classification Search
CPC ... F16K 27/029; F16K 31/06; F16K 31/0665; H01F 7/1607; Y10T 137/87217
USPC .................. 137/596.17; 251/129.08, 129.14, 251/129.19
See application file for complete search history.

(56) References Cited

U.S. PATENT DOCUMENTS

| | | | | |
|---|---|---|---|---|
| 5,104,091 | A | * | 4/1992 | Rathay et al. ............. 251/129.14 |
| 5,782,267 | A | * | 7/1998 | Yoo .......................... 137/596.17 |
| 6,877,526 | B2 | * | 4/2005 | Burrola et al. ........... 137/596.17 |
| 7,021,256 | B2 | * | 4/2006 | Wagner et al. ............. 123/90.11 |
| 7,229,063 | B2 | * | 6/2007 | Hameister et al. ........ 251/129.15 |
| 7,905,249 | B2 | | 3/2011 | Mayr et al. |
| 8,701,707 | B2 | * | 4/2014 | Moosmann et al. ...... 137/596.17 |
| 2005/0000579 | A1 | | 1/2005 | Burrola et al. |
| 2005/0067028 | A1 | * | 3/2005 | Ryuen et al. ............. 137/596.17 |
| 2014/0311440 | A1 | * | 10/2014 | Lee et al. ................ 123/196 CP |

FOREIGN PATENT DOCUMENTS

| KR | 1020060041619 A | 5/2006 |
|---|---|---|
| KR | 1020090040087 A | 4/2009 |
| KR | 101123016 B1 | 3/2012 |

OTHER PUBLICATIONS

The First Office Action mailed May 6, 2015 for Chinese Application No. 201310344169.4.

\* cited by examiner

*Primary Examiner* — Matthew W Jellett
(74) *Attorney, Agent, or Firm* — Kinney & Lange, P.A.

(57) ABSTRACT

A solenoid valve includes a valve configured to control a flow of a fluid; and a solenoid configured to operate the valve. The valve includes: a holder having a double tube structure including an inner tube formed with a supply passage and an outer tube, a control passage being formed between the inner tube and the outer tube; a first connection port formed at a first end of the inner tube to connect the supply passage and the control passage; a ball installed within the supply passage to open and close the first connection port; a core coupled to a first end of the outer tube; a second connection port formed in the core and connected to the control passage; and a load installed to extend through the second connection port and moved by the solenoid.

9 Claims, 7 Drawing Sheets

SOLENOID VALVE

CROSS-REFERENCE TO RELATED APPLICATION

This application claims priority to Korean Patent Application No. 10-2012-0086761 filed on Aug. 8, 2012, and all the benefits accruing therefrom under 35 U.S.C. §119, the contents of which is incorporated by reference in its entirety.

FIELD OF THE INVENTION

The present invention relates to a solenoid valve; and, more particularly, to a solenoid valve used as a hydraulic pressure control valve unit of an automatic transmission.

BACKGROUND OF THE INVENTION

A transmission is a device that converts a power of an engine into an adequate torque according to the speed and load of a vehicle. The transmission is classified into a manual transmission and an automatic transmission according to its speed change type, and most of the sedans currently produced are mounted with the automatic transmission.

The automatic transmission is a transmission whose speed change operation is automatically performed in a predetermined pattern. Such an automatic transmission includes a torque converter; an actuator; a planetary gear system; a hydraulic control unit; and an electronic control unit. The hydraulic control unit is provided with a hydraulic pressure control valve unit to control a hydraulic pressure to be supplied to a clutch and the like.

A solenoid valve serves as one of pressure control valve units mounted in the hydraulic control unit of an automatic transmission The solenoid valve is classified into a spool type, a ball type, a poppet type and the like according to its internal structure. A spool type solenoid valve obtains a control pressure by appropriately adjusting the pressure of oil supplied from an oil pump using a spool.

However, the control pressure adjusted by the spool is largely set in consideration of a maximum load pressure that may be required in the speed change operation. Accordingly, this control pressure remains as an excessive pressure in a typical speed change operation requiring no maximum load pressure. Such a control pressure remaining as the excessive pressure makes the vehicle power transferring efficiency deteriorated.

In the meantime, a ball type or poppet type solenoid valve can perform a fine control of the control pressure, thereby obtaining a higher power transferring efficiency than that of the spool type solenoid valve. However, in the ball type or poppet type solenoid valve, there is some drawbacks, i.e., the complicated structure and the manufacturing process that is not easy to perform, since it is necessary to additionally provide an orifice in an inflow port to which oil is supplied.

SUMMARY OF THE INVENTION

In view of the above, the present invention provides a solenoid valve, capable of simplifying its structure, being easily manufactured and reducing a manufacturing cost.

The present invention also provides a solenoid valve, capable of increasing the responsibility without the possibility of a wrong operation of the solenoid valve by securing the coxiality of each element, thereby improving the operation reliability.

In accordance with an aspect of the present invention, a solenoid valve includes a valve configured to control a flow of a fluid; and a solenoid configured to operate the valve.

The valve includes: a holder having a double tube structure including an inner tube formed with a supply passage and an outer tube, a control passage being formed between the inner tube and the outer tube; a first connection port formed at a first end of the inner tube to connect the supply passage and the control passage; a ball installed within the supply passage to open and close the first connection port; a core coupled to a first end of the outer tube; a second connection port formed in the core and connected to the control passage; and a load installed to extend through the second connection port and moved by the solenoid.

A coupling ring may be formed in a contact surface of the core coming into contact with the outer tube, and the coupling ring may be adhered to an inner wall of the outer tube when the holder and the core are coupled to each other. Further, a catching projection may be formed in one of the outer tube and the contact surface of the core, and a catching groove into which the catching projection may be inserted is formed in the other.

A packing may be provided between the outer tube and the core. Further, an annular groove into which the packing is inserted may be formed in a contact surface of the outer tube.

In the meantime, the solenoid may include: a bobbin coupled to the core; a coil wound around an external circumferential surface of the bobbin; a plunger movably installed within the bobbin; a spring configured to elastically support the plunger toward a first end of the bobbin; and a case configured to contain a part of the holder, the core and the bobbin.

A clamping ring may be formed in one of the core and the contact surface of the bobbin, and a clamping groove into which the clamping ring is inserted may be formed in the other. In this case, the clamping groove may be formed between a pair of annular protrusions having different diameters.

The bobbin may be of a spool shape of a hollow space having a first end closed and sealed. Further, a first end of the case may be bended to be inserted into the bobbin, and a second end of the case may be caulked to surround the holder. Furthermore, the spring may be a coil spring whose diameter is increased toward the core.

In accordance with the present invention having the aforementioned configuration, since the holder has the double tube structure including the inner tube and the outer tube, it is possible to simplify the structure, obtain easy of manufacturing and reduce a manufacturing cost Further, in accordance with the present invention, the coxiality between the holder and the core can be secured through the coupling ring, and the coxiality between the core and the bobbin can be secured through the clamping ring and the clamping groove. Accordingly, it is possible to increase the responsibility without the possibility of a wrong operation, thereby improving the operation reliability.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

An exemplary embodiment of the present invention will now be described with reference to the accompanying drawings which form a part hereof. Hereinafter, in the following description and drawings, components having substantially the same configuration and function are denoted by as like reference characters as possible even in different figures.

A solenoid valve in accordance with an embodiment of the present invention includes a valve 100 for controlling the flow of a fluid; and a solenoid 200 for operating the valve 100.

Figure 1:
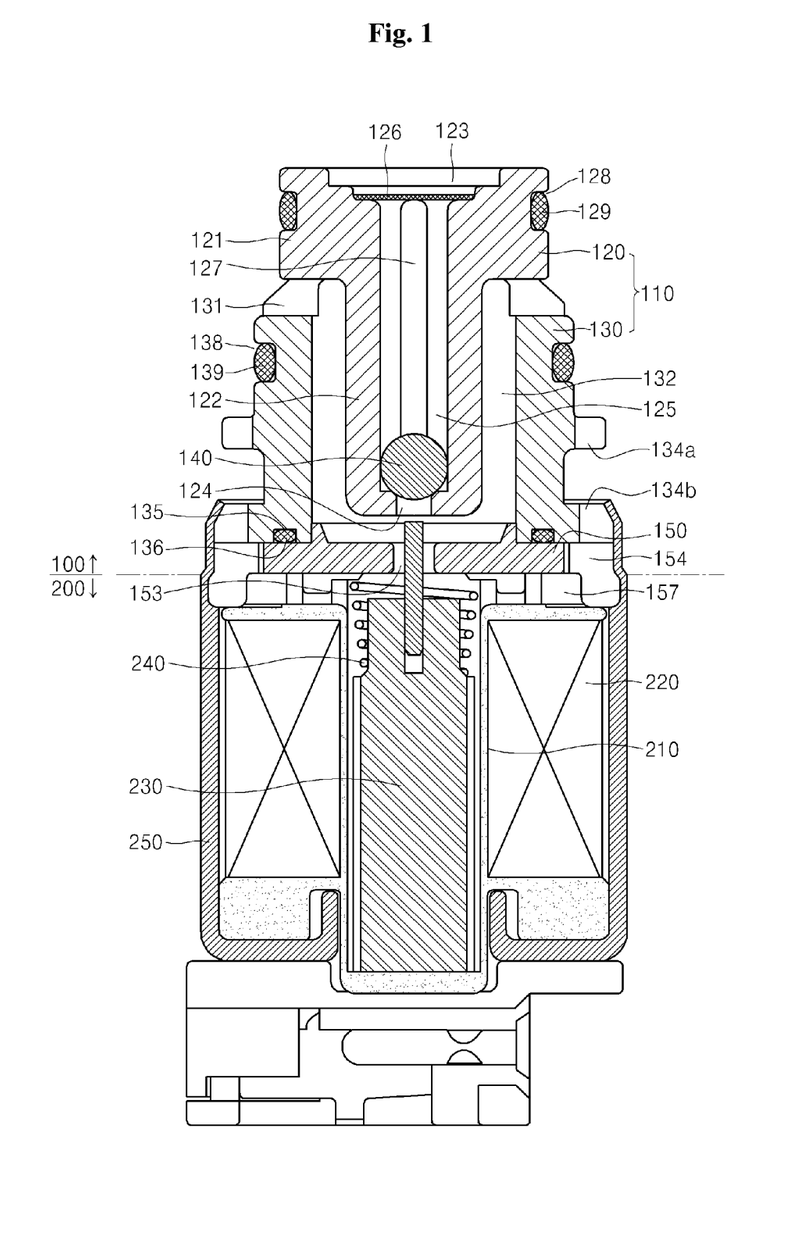
FIG. 1 is a cross-sectional view showing a solenoid valve in accordance with an exemplary embodiment of the present invention.
Figure 2:
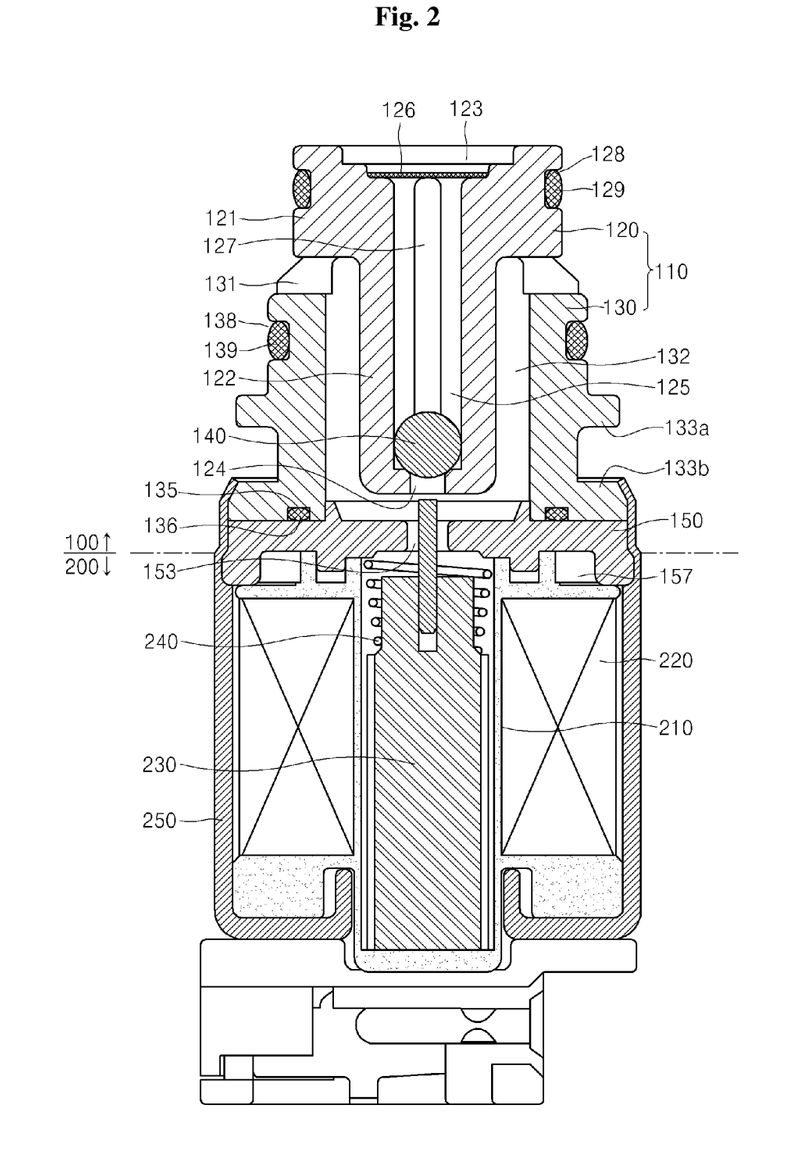
FIG. 2 is a cross-sectional view cut in another direction showing the solenoid valve in accordance with the exemplary embodiment of the present invention.

As shown in FIG. 1 and FIG. 2, the valve 100 includes a holder 110; a ball 140 installed within the holder 110; a core 150 coupled to a lower end of the holder 110; and a load 160 extended through the core 150 and moved by the solenoid 200.

The holder 110 has a double tube structure including an inner tube 120 and an outer tube 130. The outer tube 130 is formed in such a way as to surround a middle end and a lower end of the inner tube 120, and the lower end of the outer tube 130 is formed to be longer than that of the inner tube 120. Further, an upper end of the inner tube 120 is protruded toward an upper portion of the outer tube 130, and the protruded upper end of the inner tube 120 is formed to have a larger diameter than those of the middle end and the lower end of the inner tube 120.

The inner tube 120 has a multi-stage cylindrical shape including a large diameter portion 121 and a small diameter portion 122.

A supply port 123 is formed in a top surface of the inner tube 120, and a first connection port 124 is formed in a bottom surface thereof. Within the inner tube 120, a supply passage 125 for connecting the supply port 123 and the first connection port 124 is formed. Installed in the top surface of the inner tube 120 is a filter 126 for filtering foreign substances included in oil that flows thereto through the supply port 123. A transport groove 127 is formed in the inner wall of the supply passage 125 to transport oil through the ball 140 and the inner wall of the supply passage 125.

The outer tube 130 has a large cylindrical shape than the outer diameter of the inner tube 120. The upper end of the outer tube 130 is integrally formed with the large diameter portion 121 of the inner tube 120, and a plurality of control ports 131 is radially disposed in an external circumferential surface of a part where the inner tube 120 and the outer tube 130 are connected to each other. An inner diameter of the outer tube 130 is formed to be larger than the outer diameter of the inner tube 120 to form a control passage 132 between the outer tube 130 and the inner tube 120. Flanges 133a and 133b are formed in external circumferential surfaces of the middle end and the lower end of the outer tube 130. In the flange 133a and 133b, exhaust grooves 134a and 134b are formed. Further, an annular groove 135 is formed in the bottom surface of the outer tube 130. In the annular groove 135, a packing 136 for sealing a gap between the outer tube 130 and the core 150 is installed. Further, a catching projection 137 is formed at the circumference of the annular groove 135 in the bottom surface of the outer tube 130 in order to obtain the directivity when the outer tube 130 and the core 150 are coupled to each other (see FIG. 4).

In the meantime, mounting grooves 128 and 138 are formed in upper end external circumferential surfaces of the inner tube 120 and the outer tube 130. O-rings 129 and 139 are installed in the mounting groove 128 and 138. O-rings 129 and 139 serve as sealing means for preventing oil from leaking between the holder 110 and a valve body (not shown) when the solenoid valve of the present exemplary embodiment is mounted in the valve body. The O-rings 129 and 139 also serve to prevent abnormal flow of oil, e.g., the inflow of oil flowing into supply port 123 or oil exhausted from the control port 131 and an exhaust port 154 to be described later to another port adjacent thereto.

The ball 140 is installed on the supply passage 125 to serve as an opening and closing means for opening and closing the first connection port 124. In other words, the ball 140 is moved downwardly to close the first connection port 124 when oil flows thereto through the supply port 123 and is moved upwardly to open the first connection port 124 when a power is applied to the solenoid 200. The ball 140 is preferably manufactured as a steel ball having a higher specific gravity than that of the oil to prevent the first connection port 124 from being opened unintentionally.

The core 150 includes a circular plate 151 coupled to the lower end of the outer tube 130 and a side wall 152 formed in the bottom surface circumference of the circular plate 151. A second connection port 153 is formed in the center of the circular plate 151 to connect the control passage 132 with an exhaust passage 157 to be described later, and an exhaust port 154 is formed in a side wall 152 to exhaust the oil transported through the exhaust passage 157 to the outside. Formed in the top surface of the core 150 is a coupling ring 155 that is insulted into the control passage 132 when the outer tube 130 and the core 150 are coupled to each other. A catching groove 156 into which a catching projection 137 is inserted is formed at the circumference of the coupling ring 155 in the top surface of the core 150 (see FIG. 4). Moreover, a clamping ring 158 to be coupled to a bobbin 210 is formed in the bottom surface of the core 150. An exhaust groove 159 is formed in the clamping ring 158.

The aforementioned core 150 is formed in an upside-down cup shape (cylindrical shape having a top surface closed and sealed) by the circular plate 151 and the side wall 152, and an open bottom surface of the core 150 is closed and sealed by the bobbin 210. Accordingly, a predetermined space, i.e., an exhaust passage 157 is formed within the core 150. The exhaust passage 157 is connected to the control passage 132 through the second connection port 153 and to the outside through the exhaust port 154.

The load 160 is a round bar having a length extended from its lower end fixed to the plunger 230 to its upper end that is extended to the lower portion of the ball 140 through the second connection port 153. The load 160 is fixed to the plunger 230 to be moved together with the plunger 230. For example, the load 160 is raised together with the plunger 230 to move the ball 140 upwardly when a power is applied to the solenoid 200 and is lowered together with the plunger 230 to be separated from the ball 140 when the power is cut off.

Referring to FIG. 1 and FIG. 2, the solenoid 200 includes the bobbin 210; a coil 220 wound around the external circumferential surface of the bobbin 210; the plunger 230 movably installed within the bobbin 210; a spring 240 installed between the core 150 and the plunger 230; and a case 240 containing the aforementioned elements 210 to 240.

The bobbin 210 has a spool shape whose upper end and lower end at which flanges 211 and 212 are formed such that the coil 220 can be wound around the external circumferential surface thereof. Formed within the bobbin 210 is a space 213 vertically extended such that the plunger 230 can be movably installed. A lower end of the space 213 is closed and sealed in such a way as to prevent the inflow of foreign substances. In this case, a pair of annular protrusions 214 and 215 having different diameters is formed in the top surface of an upper flange 211 of a pair of flanges 211 and 212, and a clamping groove 216 into which the clamping ring 158 is inserted is formed between the annular protrusions 214 and 215.

Further, exhaust groove 217 and 218 are formed at locations corresponding to the exhaust groove 159 of the clamping ring 158 in the pair of annular protrusions 214 and 215.

The coil 220 is wound around the external circumferential surface of the bobbin 210 to generate a magnetic field around the bobbin 210 when a power is applied thereto. In this case, the magnitude of the magnetic field generated in the coil 220 is proportional to the magnitude of a current flowing along the coil 220 and the wound number of the coil 220 in respect to the bobbin 210.

The plunger 230 is a metal bar having a predetermined length and is moved by the magnetic field generated around the bobbin 220 when a power is applied to the coil 220. The plunger 230 is preferably made of a magnetic material such that it can be easily raised by the magnetic field generated when a power is applied. Particularly, a surface of the plunger 230 is more preferably coated with Tefron or the like so as to reduce an operational resistance caused by the friction with the bobbin 210 when the plunger 230 is moved.

The spring 240 is installed between the core 150 and the plunger 230 to elastically support the plunger 230 downwardly. Accordingly, the spring 240 facilitates the quick downward movement of the plunger 230 to reliably open and close the solenoid valve when the power is cut off. The spring 240 is preferably formed of a coil spring whose diameter is increased toward the core 150 in order to minimize the interference caused by the movement of the plunger 230.

The case 250 is formed in a cylindrical shape having a predetermined length in which the bobbin 210 the coil 220, the plunger 230 and spring 240 can be mounted. The upper end and the lower end of the case 250 are caulked to prevent the deviation of the mounted elements 210 to 240. Particularly, the lower end of the case 250 is bended in such a way as to surround a lower end side surface of the bobbin 210. As such, by rolling the lower end of the case 250 into the bobbin 210, it is possible to maintain the fine gap with the plunger 230, thereby obtaining a smooth flow of the magnetic force. In other words, since the fine gap formed between the case 250 and the plunger 230 cuts off or reduces the flow of the magnetic force, the narrower gap between magnetic force components leads to the smoother flow of the magnetic force Referring to FIG. 3 and FIG. 4, the coupling ring 155 formed in the top surface of the core 150 is inserted into a lower portion of the control passage 132 to be adhered to the inner wall thereof when the outer tube 130 and the core 15 are coupled to each other. Accordingly, it is possible to obtain the coxiality by aligning the outer tube 130 with the core 150 when the outer tube 130 and the core 150 are coupled to each other.

Figure 3:
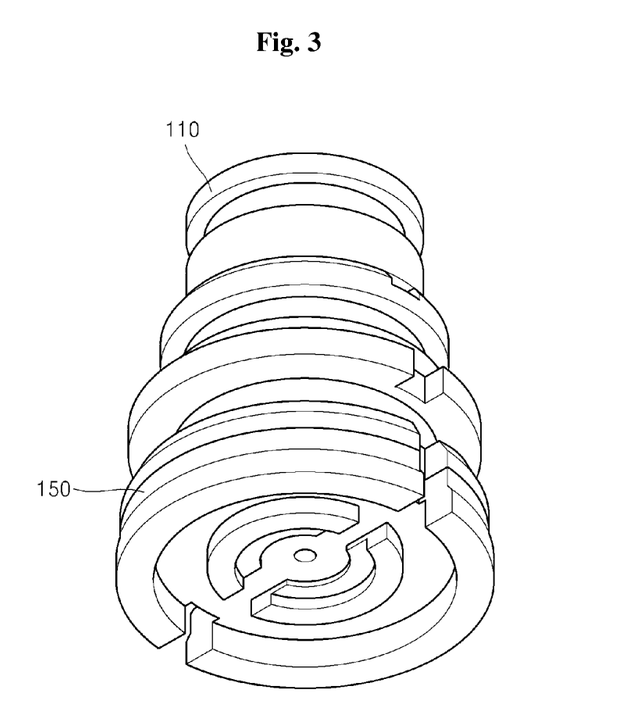
FIG. 3 is a perspective view showing a part of the solenoid valve in a state where a holder and a core are coupled to each other in accordance with the exemplary embodiment of the present invention.
Figure 4:
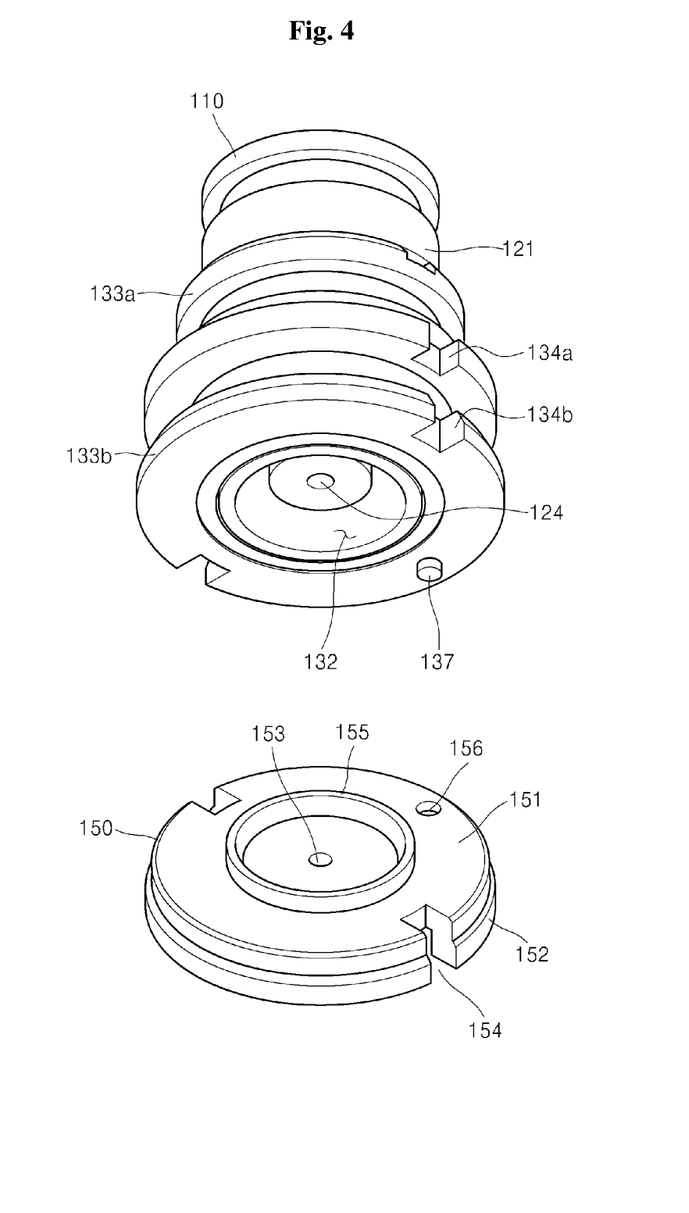
FIG. 4 is a perspective view showing a part of the solenoid valve in a state where a holder and a core are separated from each other in accordance with the exemplary embodiment of the present invention.

When the outer tube 130 and the core 150 are coupled to each other, the catching projection 137 formed in the bottom surface of the outer tube 130 is inserted into the catching groove 156 formed in the top surface of the core 150. In the case where the outer tube 130 and the core 150 are coupled to each other, the catching projection 137 and the catching groove 156 serve as means for securing the directionality, so that the exhaust ports 154 formed in the core 150 are aligned with the exhaust groove 134a and 134b formed in the core 150 when the catching projection 137 is inserted into the catching groove 156.

In the meantime, the packing 136 installed in the annular groove 135 of the outer tube 130 is protruded as compared with the bottom surface of the outer tube 130. Accordingly, the packing 136 can completely seal a gap between the outer tube 130 and the core 150 when the outer tube 130 and the core 150 are coupled to each other.

Figure 5:
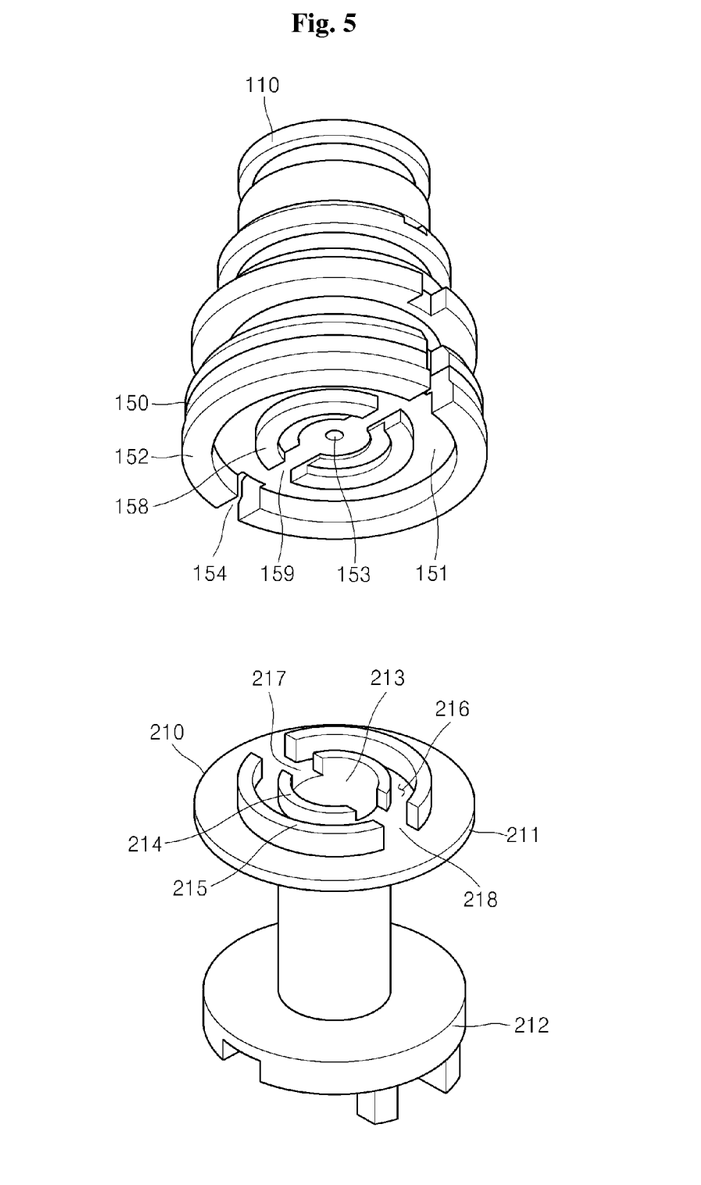
FIG. 5 is a perspective view showing a holder, a core and a bobbin of the solenoid valve in accordance with the exemplary embodiment of the present invention.

Referring to FIG. 5, the clamping ring 158 is formed in the bottom surface of the core 150, and the pair of annular protrusions 214 and 215 is formed in the upper flange 211 of the bobbin 210. The clamping groove 216 is formed between the pair of annular protrusions 214 and 215. With such a configuration, the clamping ring 158 is inserted into the clamping groove 216 when the core 150 and the bobbin 210 are coupled to each other. Accordingly, the core 150 can be aligned with the bobbin 210 to obtain the coxiality. Particularly, the exhaust grooves 159, 217, and 218 are formed in the clamping ring 158 and the pair of annular protrusions 214 and 215, so that the oil flowing into the exhaust passage 157 (FIG. 1 and FIG. 2) can be transported to the exhaust port 154.

Figure 6:
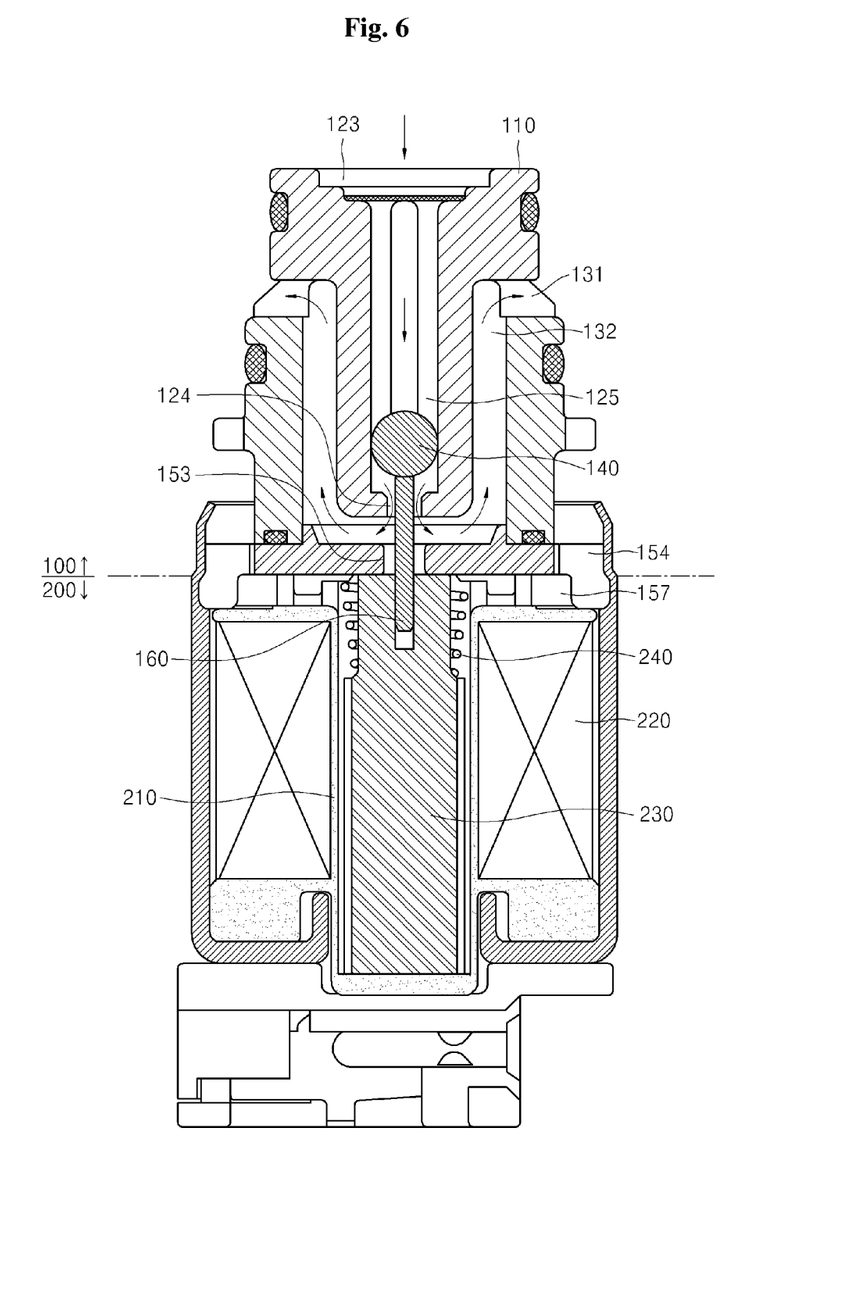
FIG. 6 and FIG. 7 show operation states of the solenoid valve in accordance with the exemplary embodiment of the present invention.
Figure 7:
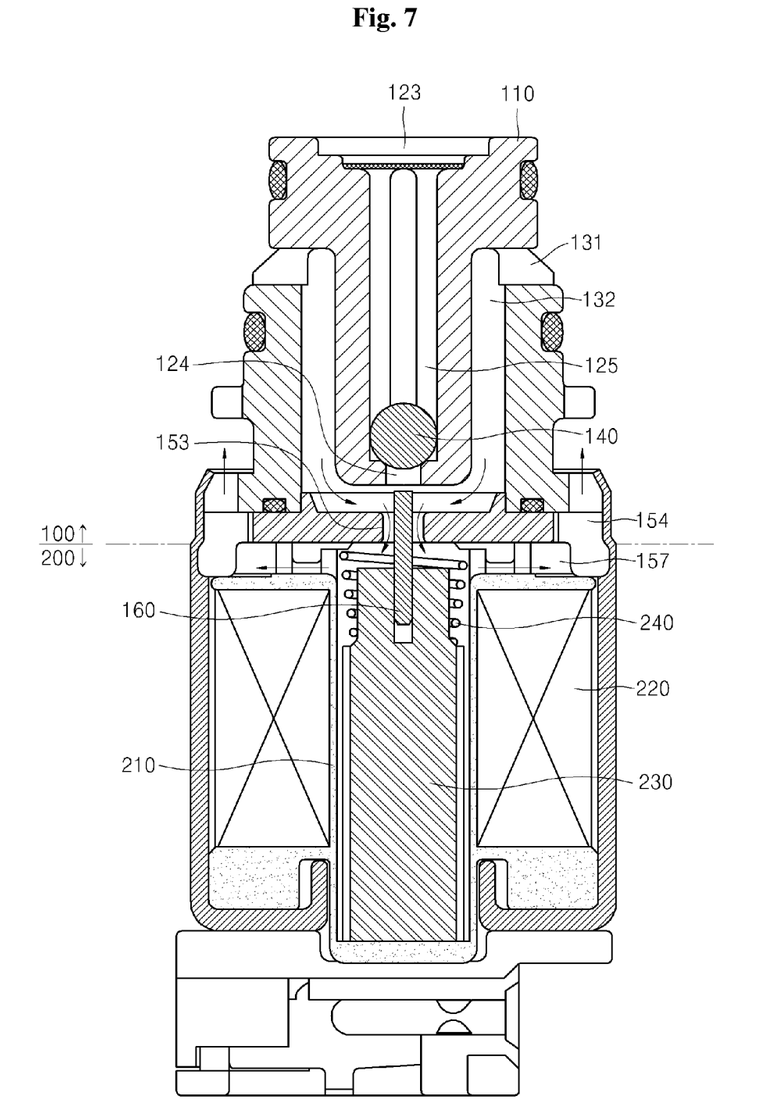

With reference to FIG. 6 and FIG. 7, an operation process of the solenoid valve will be described below in accordance with the present exemplary embodiment.

FIG. 6 shows the state where a power is applied to the solenoid 200. In other words, a current is applied to the coil 220 to thereby generate a magnetic field around the bobbin 210, so that plunger 230 is raised by the generated magnetic field. The load 160 is raised together with the plunger 230 to move the ball upwardly. As the ball 140 is moved upwardly, the first connection port 124 is opened to thereby connect the supply passage 125 with the control passage 132. Accordingly, the oil supplied from the outside flows into the holder 110 through the supply port 123 and is transported through the supply passage 125. Then, the oil is exhausted to the control passage 132 through the first connection port 124. The oil exhausted to the control passage 132 is transported through the control passage 132 and then exhausted to the clutch (not shown) of the automatic transmission through the control port 131. In this case, the plunger 230 raised by the magnetic field closes the second connection port 153 to prevent the oil exhausted to the control passage 132 from being exhausted to the exhaust passage 157 through the second connection port 153.

In the meantime, once the power applied to the solenoid 200 is cut off, the plunger 230 and the load 160 are moved downwardly by the elasticity of the spring 240 (see FIG. 7). Once the load 160 is moved downwardly, the ball 140 is lowered by the oil flowing thereto through the supply port 123 to close the first connection port 124. Simultaneously, the second connection port 153 is opened by the downward movement of the plunger 230, so that the control passage 132 and the exhaust passage 157 are connected to each other. Accordingly, the oil flowing thereto through the supply port 123 is not transported to the control passage 132, but only the oil remaining in the control passage 132 is exhausted to the outside through the exhaust passage 157 and the exhaust port 154.

While the invention has been shown and described with respect to the embodiments, it will be understood by those skilled in the art that various changes and modifications may be made without departing from the scope of the invention as defined in the following claims.

What is claimed is:

1. A solenoid valve comprising:
   a valve configured to control a flow of a fluid; and
   a solenoid configured to operate the valve,
   wherein the valve includes:
   a holder having a double tube structure including an inner tube formed with a supply passage and an outer tube, a control passage being formed between the inner tube and the outer tube;
   a first connection port formed at a first end of the inner tube to connect the supply passage and the control passage;
   a ball installed within the supply passage to open and close the first connection port;
   a core coupled to a first end of the outer tube;
   a second connection port formed in the core and connected to the control passage;
   a load installed to extend through the second connection port and moved by the solenoid;
   and wherein the solenoid includes:
   a bobbin coupled to the core, wherein a pair of annular protrusions having different diameters is formed in a top surface of an upper flange of the bobbin, and wherein a clamping groove is formed between the pair of annular protrusions;
   a coil wound around an external circumferential surface of the bobbin;
   a plunger movably installed within the bobbin;
   a spring configured to elastically support the plunger toward a first end of the bobbin; and
   a case configured to contain a part of the holder, the core and the bobbin.

2. The solenoid valve of claim 1, wherein a coupling ring is formed in a contact surface of the core coming into contact with the outer tube, and
   the coupling ring is adhered to an inner wall of the outer tube when the holder and the core are coupled to each other.

3. The solenoid valve of claim 2, wherein a catching projection is formed in one of the outer tube and the contact surface of the core, and
   a catching groove into which the catching projection is inserted is formed in the other.

4. The solenoid valve of claim 3, wherein a packing is provided between the outer tube and the core.

5. The solenoid valve of claim 4, wherein an annular groove into which the packing is inserted is formed in a contact surface of the outer tube.

6. The solenoid valve of claim 1, wherein a clamping ring is formed in one of the core and a contact surface of the bobbin, and
   the clamping groove into which the clamping ring is inserted is formed in the other.

7. The solenoid valve of claim 1, wherein the bobbin is of a spool shape of a hollow space having a first end closed and sealed.

8. The solenoid valve of claim 1, wherein a first end of the case is bent to be inserted into the bobbin, and
   a second end of the case is caulked to surround the holder.

9. The solenoid valve of claim 1, wherein the spring is a coil spring whose diameter is increased toward the core.

\* \* \* \* \*